(12) United States Patent
Schwarz et al.

(10) Patent No.: US 9,976,489 B2
(45) Date of Patent: May 22, 2018

(54) GAS TURBINE ENGINE FOR LONG RANGE AIRCRAFT

(71) Applicant: United Technologies Corporation, Hartford, CT (US)

(72) Inventors: Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 1013 days.

(21) Appl. No.: 14/107,273

(22) Filed: Dec. 16, 2013

(65) Prior Publication Data

US 2015/0167676 A1 Jun. 18, 2015

(51) Int. Cl.
*F02C 7/36* (2006.01)
*F02K 3/06* (2006.01)

(52) U.S. Cl.
CPC ............... *F02C 7/36* (2013.01); *F02K 3/06* (2013.01); *F05D 2250/30* (2013.01); *F05D 2260/40311* (2013.01)

(58) Field of Classification Search
USPC ....... 415/1, 60, 66, 68; 60/226.1, 226.3, 262
See application file for complete search history.

(56) References Cited

U.S. PATENT DOCUMENTS

| 3,287,906 A | 11/1966 | McCormick |
| 3,620,021 A * | 11/1971 | Lawrie .......................... 60/226.1 |
| 5,915,917 A | 6/1999 | Eveker et al. |
| 6,647,707 B2 * | 11/2003 | Dev .............................. 60/39.43 |
| 8,386,148 B2 | 2/2013 | Hyde et al. |
| 8,543,264 B1 | 9/2013 | Tomas |
| 2003/0163983 A1 | 9/2003 | Seda et al. |
| 2010/0148396 A1 | 6/2010 | Xie et al. |
| 2010/0331139 A1 | 12/2010 | McCune |
| 2012/0171018 A1 | 7/2012 | Hasel et al. |
| 2012/0198816 A1 * | 8/2012 | Suciu et al. ................. 60/226.3 |

(Continued)

FOREIGN PATENT DOCUMENTS

| EP | 2535548 A2 | 12/2012 |
| GB | 1516041 | 6/1978 |

(Continued)

OTHER PUBLICATIONS

Boeing, 787 Dreamliner Fact Sheet, retrieved Jan. 31, 2014 from http://www.boeing.com/boeing/commercial/787family/787-8prod.page.*

(Continued)

*Primary Examiner* — Logan Kraft
*Assistant Examiner* — Jason Davis
(74) *Attorney, Agent, or Firm* — Carlson, Gaskey & Olds, P.C.

(57) ABSTRACT

A gas turbine engine comprises a fan for delivering air into a bypass duct as bypass flow, into a core housing as core flow, with the core housing containing an upstream compressor rotor and a downstream compressor rotor. An overall pressure ratio is defined across the upstream and downstream compressor rotors. A bypass ratio is defined as a volume of air delivered as bypass flow compared to a volume of air delivered into the core housing. The overall pressure ratio is greater than or equal to about 45.0, and the bypass ratio is greater than or equal to about 11.0.

4 Claims, 1 Drawing Sheet

(56) References Cited

U.S. PATENT DOCUMENTS

| | | | |
|---|---|---|---|
| 2012/0233981 A1* | 9/2012 | Smith et al. | 60/226.3 |
| 2012/0233982 A1* | 9/2012 | Suciu et al. | 60/226.3 |
| 2013/0192197 A1 | 8/2013 | Feulner et al. | |
| 2013/0195647 A1 | 8/2013 | Muldoon et al. | |
| 2013/0219859 A1 | 8/2013 | Suciu et al. | |

FOREIGN PATENT DOCUMENTS

| | | |
|---|---|---|
| GB | 2041090 | 9/1980 |
| WO | 2007038674 | 4/2007 |
| WO | 2013116257 A1 | 8/2013 |

OTHER PUBLICATIONS

Boeing, About the 787 Family, retrieved Jan. 31, 2014 from http://www.boeing.com/boeing/commercial/787family/background.page.*

Wikipedia, Boeing 787 Dreamliner, retrieved Feb. 5, 2014 from http://en.wikipedia.org/wiki/Boeing_787_Dreamliner#Specifications, Specification section.*

Civil Turbojet/Turbofan Specifications, Jet Engine Specification Database (Apr. 3, 2005).

Supplementary European Search Report for European Application No. 14880953.6 dated Aug. 7, 2017.

International Search Report and Written Opinion for International Application No. PCT/US2014/064477 dated Aug. 19, 2015.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

International Preliminary Report on Patentability for International Application No. PCT/US2014/064477 dated Jun. 30, 2016.

* cited by examiner

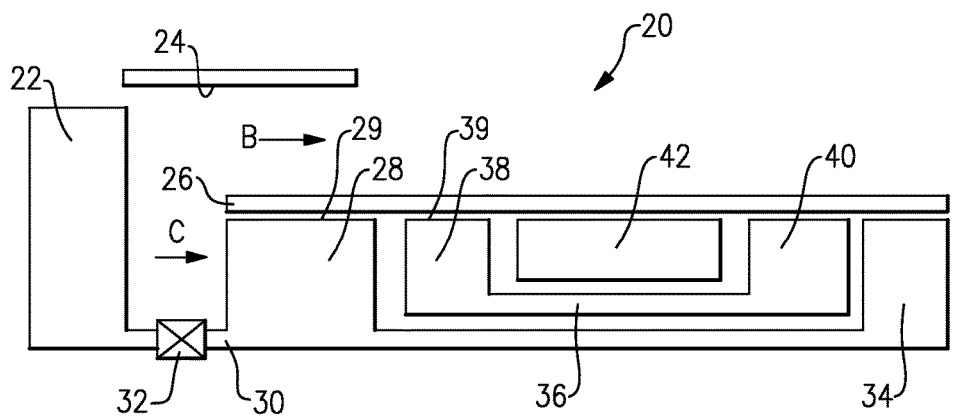
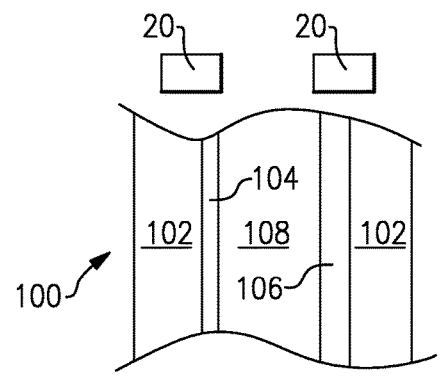
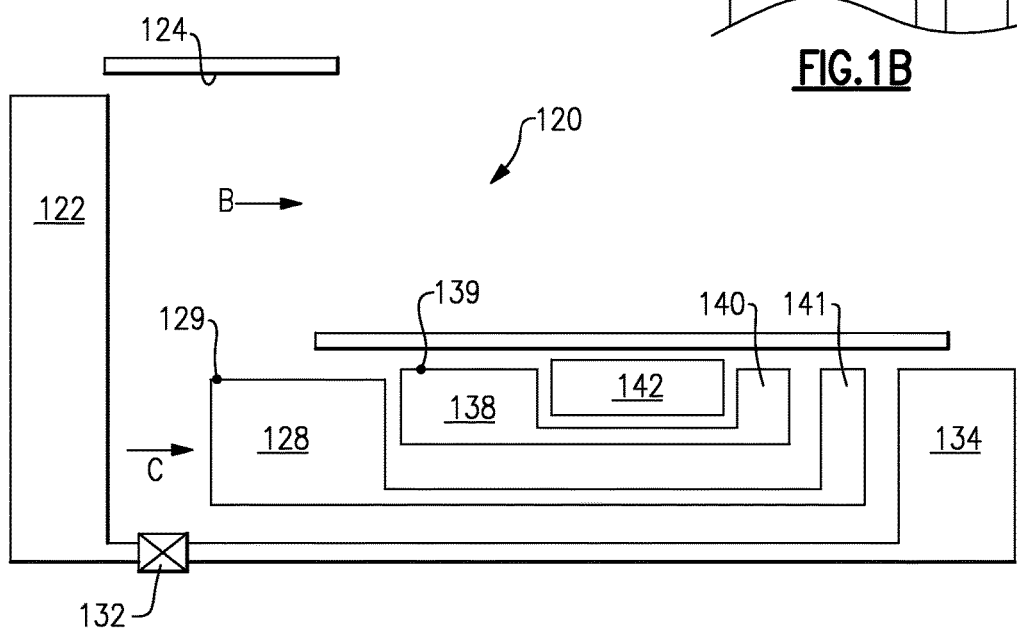

GAS TURBINE ENGINE FOR LONG RANGE AIRCRAFT

BACKGROUND OF THE INVENTION

This application relates to a gas turbine engine designed for use on longer range aircraft.

Gas turbine engines are known and may include a fan delivering air into a bypass duct as propulsion air. In addition, the fan typically delivers air into a core housing and to a compressor. There are, typically, at least two compressor rotors with an upstream or lower pressure rotor compressing the air and then delivering it into a downstream or higher pressure rotor. The compressed air from the downstream compressor rotor is typically delivered into a combustion section where it is mixed with fuel and ignited. Products of this combustion may pass downstream over turbine rotors including an upstream turbine rotor that drives the downstream compressor rotor and a downstream turbine rotor that drives the upstream compressor rotor.

In one type engine, the downstream turbine rotor also drove a fan rotor, such that the fan rotor, the upstream compressor rotor, and the downstream turbine rotor all rotated at a single speed. More recently, a gear reduction has been placed between the fan rotor and the downstream turbine rotor or the fan drive turbine.

It is desirable to increase the compression ratio or the amount of compression done to air across the two compressor rotors. However, there has been a significant limitation in that the stress and temperature at the downstream end of the downstream compressor rotor limits how high the overall compression ratio may reach.

This area must be designed to withstand the repeated application of the highest stress situations for the gas turbine engine which typically occurs during take-off.

SUMMARY OF THE INVENTION

In a featured embodiment, a gas turbine engine comprises a fan for delivering air into a bypass duct as bypass flow, and into a core housing as core flow, with the core housing containing an upstream compressor rotor and a downstream compressor rotor. An overall pressure ratio is defined across the upstream and downstream compressor rotors. A bypass ratio is defined as a volume of air delivered as bypass flow compared to a volume of air delivered into the core housing. The overall pressure ratio is greater than or equal to about 45.0, and the bypass ratio is greater than or equal to about 11.0.

In another embodiment according to the previous embodiment, the gas turbine engine is designed for use on long range aircraft defined as aircraft with at least two passenger aisles.

In another embodiment according to any of the previous embodiments, a fan drive turbine is configured to drive the upstream compressor rotor and the fan rotor through a gear reduction, with the fan drive turbine having at least three stages.

In another embodiment according to any of the previous embodiments, the fan drive turbine has six or fewer stages.

In another embodiment according to any of the previous embodiments, a ratio of a tip speed at the downstream compressor rotor compared to a tip speed at the upstream compressor rotor is less than or equal to about 1.18 and greater than or equal to about 1.0.

In another embodiment according to any of the previous embodiments, the bypass ratio is greater than or equal to about 14.0.

In another embodiment according to any of the previous embodiments, the overall pressure ratio across the upstream and downstream compressor rotors is equal to or greater than about 60.0.

In another embodiment according to any of the previous embodiments, a gear ratio of the gear reduction is greater than or equal about 2.6.

In another embodiment according to any of the previous embodiments, the gas turbine engine is designed for use on long range aircraft defined as aircraft with a flight length equal to, or greater than about 6.0 hours.

In another embodiment according to any of the previous embodiments, the upstream compressor rotor has at least three stages.

In another embodiment according to any of the previous embodiments, the upstream compressor rotor has seven or fewer stages.

In another embodiment according to any of the previous embodiments, a fan drive turbine is configured to drive the upstream compressor rotor and the fan rotor through a gear reduction, with the fan drive turbine having at least three stages.

In another embodiment according to any of the previous embodiments, the fan drive turbine has six or fewer stages.

In another embodiment according to any of the previous embodiments, a ratio of a tip speed at the downstream compressor rotor compared to a tip speed at the upstream compressor rotor is less than or equal to about 1.18 and greater than or equal to about 1.0.

In another embodiment according to any of the previous embodiments, the bypass ratio is greater than or equal to about 14.0.

In another embodiment according to any of the previous embodiments, the overall pressure ratio across the upstream and downstream compressor rotors is equal to or greater than about 60.0.

In another embodiment according to any of the previous embodiments, a gear ratio of the gear reduction is greater than or equal about 2.6.

In another embodiment according to any of the previous embodiments, a fan drive turbine is configured to drive the fan rotor through a gear reduction.

In another embodiment according to any of the previous embodiments, the fan drive turbine also is configured to drive the upstream compressor rotor, along with the fan rotor.

In another embodiment according to any of the previous embodiments, there are two additional turbine rotors upstream of the fan drive turbine for respectively driving the upstream and downstream compressor rotors.

In another embodiment according to any of the previous embodiments, a ratio of a tip speed at the downstream compressor rotor compared to a tip speed at the upstream compressor rotor is less than or equal to about 1.18 and greater than or equal to about 1.0.

In another embodiment according to any of the previous embodiments, the overall pressure ratio across the upstream and downstream compressor rotors is equal to or greater than about 60.0.

In another embodiment according to any of the previous embodiments, a gear ratio of the gear reduction is greater than or equal about 2.6.

These and other features may be best understood from the following drawing and specification.

BRIEF DESCRIPTION OF THE DRAWINGS

FIG. 1A schematically shows a gas turbine engine wherein the fan-driving turbine also drives the upstream compressor.

FIG. 1B schematically shows an aircraft that may incorporate the engine of FIG. 1A or FIG. 2.

FIG. 2 schematically shows another gas turbine engine.

DETAILED DESCRIPTION

A gas turbine engine 20 shown schematically in FIG. 1A, is designed for use on long range aircraft.

As known, a fan rotor 22 delivers bypass air B within a nacelle 24. A core engine housing 26 receives core air flow C from the fan rotor 22. The core air flow C initially reaches an upstream compressor rotor 28, which compresses the air to a first lower level and then delivers that air into a downstream compressor rotor 38, where additional compression occurs.

The air from the compressor rotor 38 is delivered into a combustion section 42, mixed with fuel and ignited. Products of this combustion pass downstream over an upstream turbine rotor 40, which operates at a higher pressure and speed and drives a shaft 36 to drive the downstream compressor rotor 38. Downstream of the turbine rotor 40, the products of combustion drive a fan drive turbine 34 which is a downstream turbine rotor and operates at a lower pressure and speed than does the turbine rotor 40. The fan drive turbine 34 drives the upstream compressor rotor 28 through a shaft 30 and drives the fan rotor 22 through a gear reduction 32.

Applicant has recognized that on longer range aircraft the percentage of engine operation time at high stress level, such as take-off, becomes a very small percentage of the overall operation time. Long range aircraft may be defined as traveling 3,000 to 8,000 miles or more, and from about 6 to about 16 hours of flying time during a typical flight.

Often these aircraft can also be described as "twin aisle" aircraft because they are wide body aircraft as opposed to single aisle aircraft which are used on inter-continental flights or to feed airports that are used as hub-and-spoke airports for connecting flights.

As shown in FIG. 1B, an aircraft 100 schematically includes two engines 20. There are aisles 104 and 106 separating seating areas 102 and 108.

Take-off and climb will typically occur for only 45 seconds at take-off power followed by perhaps 20 minutes at climb. In such an example, the ratio of time at low power cruise to climb and take-off is at least 15 to 1 and can become as high as 40 to 1.

With such systems, it is possible to achieve higher pressure ratios because the high stress situations on the downstream end of the downstream compressor rotor 38 will occur much less frequently and over a small percentage of the overall operational time across the life of the engine.

In disclosed embodiments, the overall pressure ratio or amount of compression by the combined rotors 28 and 38 to the core air flow C may be equal to or above about 45.0, above about 60.0, and above about 65.0.

In addition, a bypass ratio or ratio of the volume of air delivered as bypass flow B to the volume of air delivered as core air flow C may be equal to or greater than about 11.0, and greater than or equal to 12.0, or greater than or equal to 14.0.

A gear ratio of the gear reduction 32 may be greater than or equal to about 2.6, greater than or equal to about 2.9, or greater than or equal to about 3.6.

The upstream compressor rotor 28 may have less than or equal to seven stages, or from three to seven stages. The fan drive turbine 34 may have three or more stages, or from three to six stages.

A tip speed at the tip 39 of the downstream compressor rotor 38 compared to the tip speed at tip 29 of the upstream compressor rotor 28 is less than or equal to about 1.8 and greater than or equal to about 1.0. Tip speed is defined as the tangential velocity of the leading edge of the longest blade.

Finally, the take-off thrust for the long range aircraft is greater than about 50,000 lbf at static CSLTO 86° F. The take-off thrust may be as high as 124,000 lbf at sea-level static condition.

Another factor for peak efficiency which this compression section is designed to produce is that there be at least two turbine rotors (40) in front of the fan-driving turbine. This allows for reasonable mach numbers through the turbine section ahead of the fan drive turbine which improves overall engine efficiency and reduces temperatures into the fan drive turbine to a manageable level. In contrast, a single turbine rotor ahead of the fan drive turbine may lower overall engine efficiency and drive up temperatures into the fan drive turbine to such an extent that at least one of the fan drive turbine stages may have to be cooled, owing to the stresses there. Cooling the fan drive turbine also lowers the efficiency of the overall engine cycle.

The fan diameter is significantly larger than that of the low pressure compressor 28, and the low pressure turbine 40 has a pressure ratio that is greater than about five 5:1. The low pressure turbine 40 pressure ratio is pressure measured prior to inlet of low pressure turbine 40 as related to the pressure at the outlet of the low pressure turbine 40 prior to an exhaust nozzle. The geared architecture 32 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram ° R)/(518.7° R)]^{0.5}$. The "Low corrected fan tip speed" as disclosed herein according to one non-limiting embodiment is less than about 1150 ft/second.

Another embodiment engine 120 is illustrated in FIG. 2. Many components are effectively identical to those shown in FIG. 1A, and carry the same numbers, simply increased by 100.

Whereas the FIG. 1A engine 20 has a fan drive turbine 34 driving a compressor 28, and a fan rotor 22 through the gear reduction 32, the FIG. 2 engine includes a higher pressure first turbine 140 driving a higher pressure downstream compressor section 138. An intermediate turbine section 141 drives the first compressor rotor, or the upstream compressor rotor 128. The fan drive turbine 134 only drives the fan rotor 122 through a gear reduction 132.

The quantities as described above with regard to the FIG. 1A embodiment, would also be true of the FIG. 2 embodiment.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan for delivering air into a bypass duct as bypass flow and into a core housing as core flow, with said core housing containing an upstream compressor rotor and a downstream compressor rotor, and an overall pressure ratio defined across said upstream and downstream compressor rotors, and a bypass ratio defined as a volume of air delivered as bypass flow compared to a volume of air delivered into the core housing;
said overall pressure ratio is greater than or equal to 45.0, and said bypass ratio is greater than or equal to 11;
said gas turbine engine being designed for use on a long range aircraft, with said long range aircraft being defined by an aircraft with at least two passenger aisles; and
a fan drive turbine driving said fan through a gear reduction; and
wherein a ratio of a tip speed at said downstream compressor rotor compared to a tip speed at said upstream compressor rotor is less than or equal to 1.18 and greater than or equal to 1.0.

2. A gas turbine engine comprising:
a fan for delivering air into a bypass duct as bypass flow and into a core housing as core flow, with said core housing containing an upstream compressor rotor and a downstream compressor rotor, and an overall pressure ratio defined across said upstream and downstream compressor rotors, and a bypass ratio defined as a volume of air delivered as bypass flow compared to a volume of air delivered into the core housing;
said overall pressure ratio is greater than or equal to 45.0, and said bypass ratio is greater than or equal to 11;
said gas turbine engine being designed for use on a long range aircraft, with said long range aircraft being defined by an aircraft with a flight length equal to or greater than 6.0 hours; and
a fan drive turbine driving said fan through a gear reduction;
wherein said upstream compressor rotor has at least three stages; and
wherein said fan drive turbine is configured to drive said upstream compressor rotor and said fan rotor through said gear reduction, with said fan drive turbine having at least three stages; and
wherein a ratio of a tip speed at said downstream compressor rotor compared to a tip speed at said upstream compressor rotor is less than or equal to 1.18 and greater than or equal to 1.0.

3. The gas turbine engine as set forth in claim 2, wherein the bypass ratio is greater than or equal to 14.0.

4. A gas turbine engine comprising:
a fan for delivering air into a bypass duct as bypass flow and into a core housing as core flow, with said core housing containing an upstream compressor rotor and a downstream compressor rotor, and an overall pressure ratio defined across said upstream and downstream compressor rotors, and a bypass ratio defined as a volume of air delivered as bypass flow compared to a volume of air delivered into the core housing;
said overall pressure ratio is greater than or equal to 45.0, and said bypass ratio is greater than or equal to 11;
said gas turbine engine being designed for use on a long range aircraft, with said long range aircraft being defined at least by one of an aircraft with at least two passenger aisles, or an aircraft with a flight length equal to, or greater than 6.0 hours; and
a fan drive turbine driving said fan through a gear reduction;
wherein a ratio of a tip speed at said downstream compressor rotor compared to a tip speed at said upstream compressor rotor is less than or equal to 1.18 and greater than or equal to 1.0.

* * * * *